(12) United States Patent
Perini (10) Patent No.: US 8,312,909 B2
(45) Date of Patent: Nov. 20, 2012

(54) DEVICE FOR TREATING PAPER WEBS (75) Inventor: Fabio Perini, Viareggio (IT)

(73) Assignee: Futura S.p.A., Capannori (LU) (IT)

( * ) Notice: Subject to any disclaimer, the term of this patent is extended or adjusted under 35 U.S.C. 154(b) by 312 days.

(21) Appl. No.: 12/669,119

(22) PCT Filed: Apr. 14, 2008

(86) PCT No.: PCT/IT2008/000249
§ 371 (c)(1),
(2), (4) Date: Jan. 14, 2010

(87) PCT Pub. No.: WO2009/010999
PCT Pub. Date: Jan. 22, 2009

(65) Prior Publication Data
US 2010/0181040 A1 Jul. 22, 2010

(30) Foreign Application Priority Data
Jul. 17, 2007 (IT) .................. FI2007A0162

(51) Int. Cl.
*B32B 37/00* (2006.01)
(52) U.S. Cl. ......... 156/553; 156/555; 156/578; 156/582
(58) Field of Classification Search ............... 156/209, 156/219, 553, 555, 575, 578, 580, 582, 583.1
See application file for complete search history.

(56) References Cited

U.S. PATENT DOCUMENTS

| 2,676,387 A | 4/1954 | McArn |
| 3,097,591 A | 7/1963 | Justus |
| 2006/0219110 A1* | 10/2006 | Petri .......................... 101/216 |

FOREIGN PATENT DOCUMENTS

| EP | 0 686 782 | 12/1995 |
| EP | 0 738 588 | 10/1996 |
| EP | 1 627 730 A1 | 2/2006 |
| GB | 1 035 527 | 7/1966 |
| GB | 2 373 482 | 9/2002 |

* cited by examiner

*Primary Examiner* — James Sells
(74) *Attorney, Agent, or Firm* — McGlew and Tuttle, P.C.

(57) ABSTRACT

Device for treating paper webs or plies, comprising a couple of overlapped rolls (2,3) for compressing a paper web or ply passing between them. Each of said rolls (2,3) features a fixed central shaft (20,300) supported by a corresponding holder (10,83) at its ends, on which shaft a tubular jacket is fitted, with the interposition of low-friction connecting members (21,310) which are positioned on opposite sides with respect to the center line of the fixed central shaft axis, so that said tubular jacket, which is destined to come into contact with the paper webs or plies to be treated, is free to rotate about its longitudinal axis.

20 Claims, 5 Drawing Sheets

DEVICE FOR TREATING PAPER WEBS

The present invention relates to a device for treating paper webs.

The present device can be used for embossing or calendering paper webs and, more in general, in all treatments including the passage of a paper web between two pressure rolls.

It is known that embossing units are used for embossing paper plies which can be coupled together by pressure and by applying a gluing substance.

The embossing process can be carried out for the manufacture of toilet paper, kitchen paper, paper napkins, handkerchiefs, etc. It makes the paper softer and improves the tactile sensation we have when we touch it, increases the ply thickness as well as the external diameter of the paper when it is wound to form a roll, and it allows personalization of the paper material with ornamental motifs or other kinds of decorations.

According to a known technique, the above-mentioned products consist of one or more paper webs or plies which are separately embossed and are subsequently coupled to each other by gluing and by rolling them between two counter-rotating rolls.

Each ply is passed between a couple of rolls, which are respectively called rubber roll and steel roll or engraved roll before being glued to the other ply. The engraved roll is provided with points or protrusions for determining corresponding deformations on the paper ply being worked. In practice, two paper plies are separately embossed and are coupled by means of a very thin glue layer between them. In this kind of embossing, the paper plies are fed separately to two opposed steel/rubber embossing units. The glue is applied by means of a gluing device on one of the two paper plies when it is on a corresponding engraved roll. During the gluing process of the embossed plies, a predetermined pressure is exerted on them by means of a further roll called pressure roll or "marriage roll".

Figure 1:
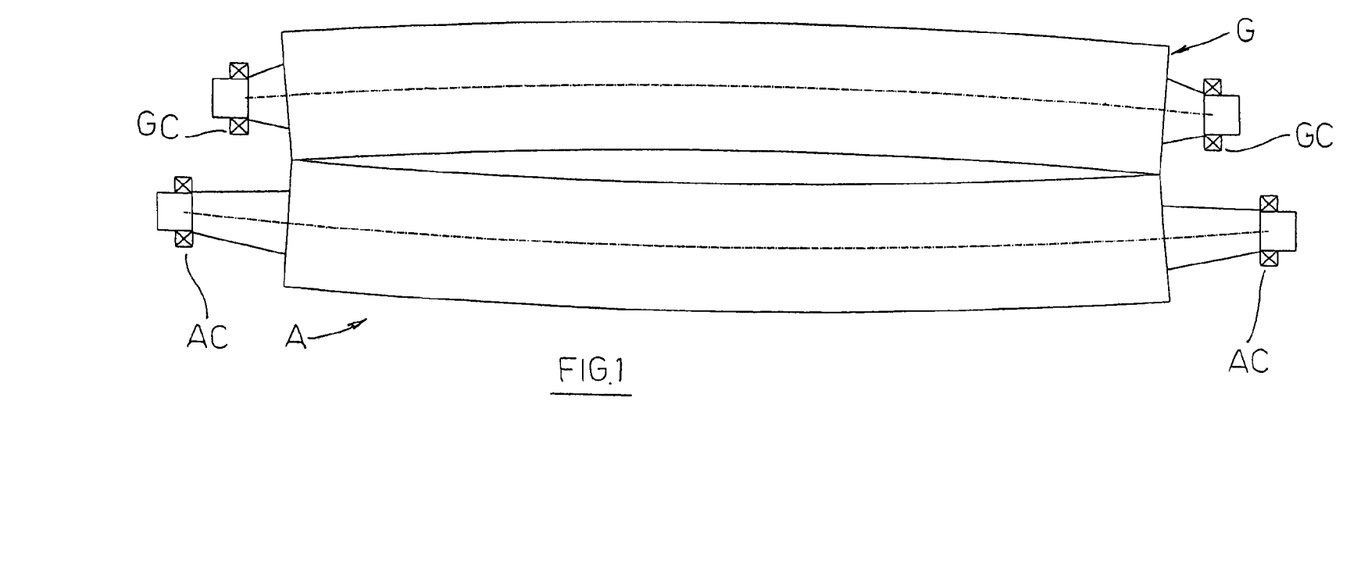
FIG. 1 shows a steel or engraved roll "A" and a rubber roll "G" of known embossing units in a typical configuration during operation.

One of the inconveniences of the known embossing units is connected with the deformation of the rolls between which the paper webs or plies pass. In fact, as shown in FIG. 1 (which represents a steel roll or engraved roll "A" and a known rubber roll "G" of the known type in a typical configuration during operation) both rolls tend to bend; therefore, the steel roll does not properly act on the paper web and leads to a dissatisfactory embossing process, that is to say a embossing process which is not adequate for the high quality standards currently imposed by the market, since the features of the embossed product are not constant.

In order to reduce the said inconvenience, the pressure exerted by the rubber roll is decreased, but this results in a less evident embossing process, that is to say in a less deep embossing and, as a consequence, the finished product has a relatively limited thickness. As an alternative, use is made of very complex mechanical systems including skew-axis rolls, which involve very high manufacturing costs. Yet as an alternative, use is made of swelled rubber rolls whose swelling is only ideal for an extremely reduced range of pressure values, below or above which the positive effects of swelling are cancelled out. The same problems can occur with the calenders used to make paper thickness uniform and, more in general, in all those productive process which involve the compression of a paper webs between two rolls.

The main aim of the present invention is to eliminate, or at least to reduce, the above mentioned drawbacks.

These results have been achieved, according to the present invention, by providing a device having the features described in claim 1. Further features of the present invention are the subject of the dependent claims.

A device according to the present invention allows the realization of paper treatment systems thanks to which it is possible to obtain a finished product which meets the highest quality standards. The device subject of the present invention can advantageously be used for embossing and calendering paper webs and, more in general, in each process which involves the compression of a paper web between two rolls. Moreover, the present device is relatively easy to use and cheap in relation to the advantages it offers and its features remain basically unchanged during operation and there is no need for special maintenance.

These and further advantages and characteristics of the present invention will be better understood by anyone from the following description, with the aid of the enclosed drawings, given here only as a practical example of the invention, but without limiting it in any sense, wherein.

As previously said, FIG. 1 shows an embodiment of an engraved roll A and of a rubber roll G for conventional embossing units. Rolls A and G are connected to the frame of an embossing unit (which is not illustrated) by means of a corresponding couple of end bearings AC,GC. In the inoperative condition, the longitudinal axes of rolls A and G are basically rectilinear and horizontal. During operation, instead, when the engraved roll A is subject to the pressure exerted by the rubber roll G, the longitudinal axes and the external surfaces of both rolls A and G bend and assume a configuration which is inadequate for a correct embossing process on the paper which passes between them. The same happens when the rolls marked with references A and G in FIG. 1 are two smooth rolls of a calender. In this case, the configuration they assume is inadequate for a correct calendering process of the paper.

Figure 2:
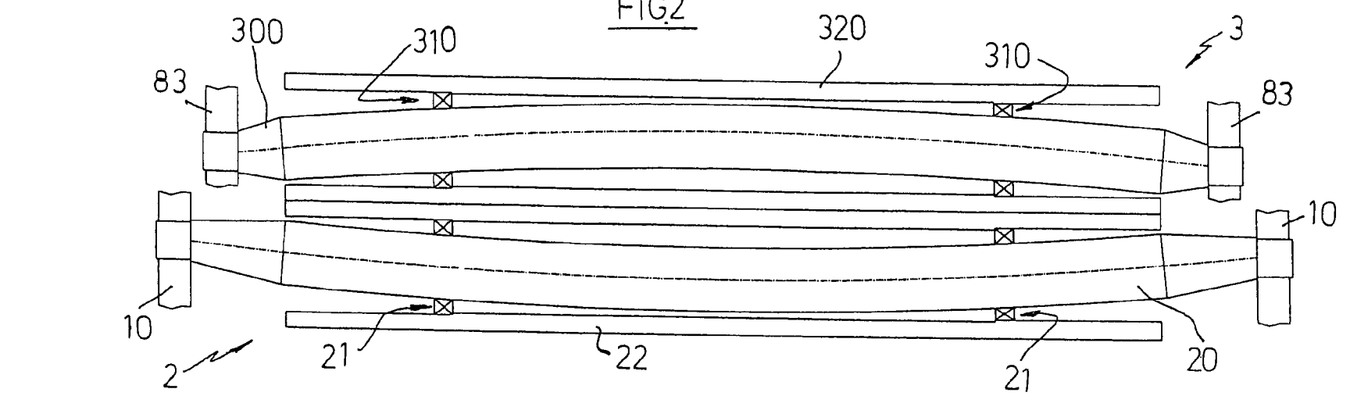
FIG. 2 schematically shows a device according to the present invention during operation.

With reference to FIG. 2, a device according to the present invention comprises a couple of overlapped rolls 2,3 having parallel axes, each of which features a fixed central shaft and an external jacket fitted on the fixed shaft by interposition of low friction lateral-intermediate bearings, on opposite sides with respect to the center line of the fixed shaft. The said jacket defines the external surface of the roll destined to come into contact with the paper to be treated.

For example, as further described in the following, said rolls 2,3 can be respectively an engraved roll and a rubber roll which can be used in a embossing unit 1 (schematically shown in FIG. 2 and in FIG. 3). In FIG. 2, a steel roll or engraved roll for embossing units according to the present invention comprises a fixed central shaft 20 firmly joined to the frame 10 of the embossing unit 1 at its ends. Two low-friction connecting members are disposed on the shaft 20; in the example, the said low-friction connecting members are constituted by two bearings 21 which are positioned in two lateral-intermediate zones, symmetrically with respect to the center line of the shaft 20 (the center line being hereinafter defined as the plane, orthogonal to the longitudinal axis of the fixed shaft, which theoretically subdivides the same shaft into two identical parts). A tubular jacket 22 is fitted on the said bearings and is provided with external protrusions thanks to the embossing of a paper web or ply passing between the roll 2 and the respective rubber roll 3 is achieved. The said jacket 22 is free to rotate about the axis of the fixed shaft 20. Similarly, the rubber roll 3 comprises a fixed central shaft 300 firmly joined to corresponding holders 83 (described in the following) at its ends. Two low-friction connecting members are disposed on the shaft 300. According to this example, the said connecting members are constituted by two bearings 310 which are positioned in two lateral-intermediate zones, symmetrically with respect to the center line of the shaft 300. A rubber-coated tubular steel jacket 320 having a smooth external surface is fitted on the bearings 310. The jacket 320 is free to rotate about the axis of the fixed shaft 300. As shown in FIG. 2, the bearings 21 are nearer to each other with respect to the ends of the shaft 20 which are supported by the frame 10. Similarly, the bearings 310 are nearer to each other with respect to the ends of the shaft 300 which are supported by the holders 83. In other words, the distance between the bearings 21 is less than the total length of the shaft 20 and the distance between the bearings 310 is less than the total length of the shaft 300.

FIG. 2 shows the effects of the pressure exerted by the roll 3, which pressure determines the bending of the fixed shafts 20 and 300 but basically does not affect the shape of the jackets 22 and 320 whose profiles remain basically unchanged. This happens because the said bearings are disposed in correspondence of a pressure-loaded zone, so the ends of the jackets tend to bend, rotating about the center of the same bearings, whilst the intermediate parts of the jackets comprised between the bearings tend to bend and to rotate in the opposite direction. Therefore, the bending effects concerning the jacket of each roll are less evident than in the conventional devices of this type, due to the fact that the bearings are nearer to each other with respect to the configuration shown in FIG. 1.

Figure 6:
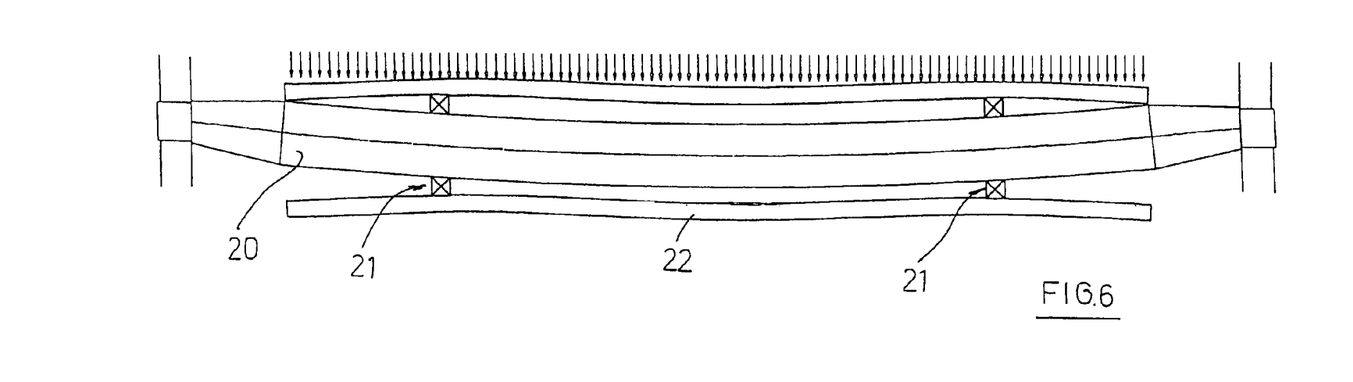
FIG. 6 shows the deformation of the jacket (22) during operation.

Furthermore, the said bending effects involving the ends of the jackets are compensated by the opposed bending effects concerning the intermediate parts, the bending of the jackets ends being opposite to that involving the jackets parts comprised between the bearings. In practice, the deformation of the jackets 22 and 320 is so low that it does not adversely affect the embossing process (see FIG. 6). FIG. 3 shows an embossing unit 1 provided with the device shown in FIG. 2.

The embossing unit 1 can be used in a process in which a plurality of paper webs or plies (two in this example) are embossed and coupled together. To simplify the drawings, the paper webs or plies are not represented.

As further described below, the unit 1 is provided with two couples of embossing rolls and each of them consists of a rubber roll 3 and of an engraved roll 2. The example shows a lower couple 2,3 which provides for embossing one of the paper webs or plies; and an upper couple 2,3 which provides for the embossing of the other paper web or ply and, in cooperation with a pressure or "marriage" roll, it carries out the gluing of the embossed webs or plies. FIG. 3 shows a pressure or "marriage" roll 7 on the right of the upper engraved roll 2 and a cliché roll on the left of the same engraved roll which distributes the glue on the paper web or ply travelling around the engraved roll 2. According to a known technique, the cliché roll receives the glue from an anilox roll 5 disposed on the left which, in turn, collects the glue from a tank 6. In practice, the glue contained in the tank 6 is collected by the anilox roll 5 that conveys it downstream (on the right in the example shown in FIG. 3), i.e. onto the cliché roll 4 which is kept at a predetermined distance from the engraved roll 2 in order to glue an already embossed paper web or ply, that is to say the paper web or ply that has already passed between the same rubber roll 3 and the upper engraved roll 2.

Figure 3:
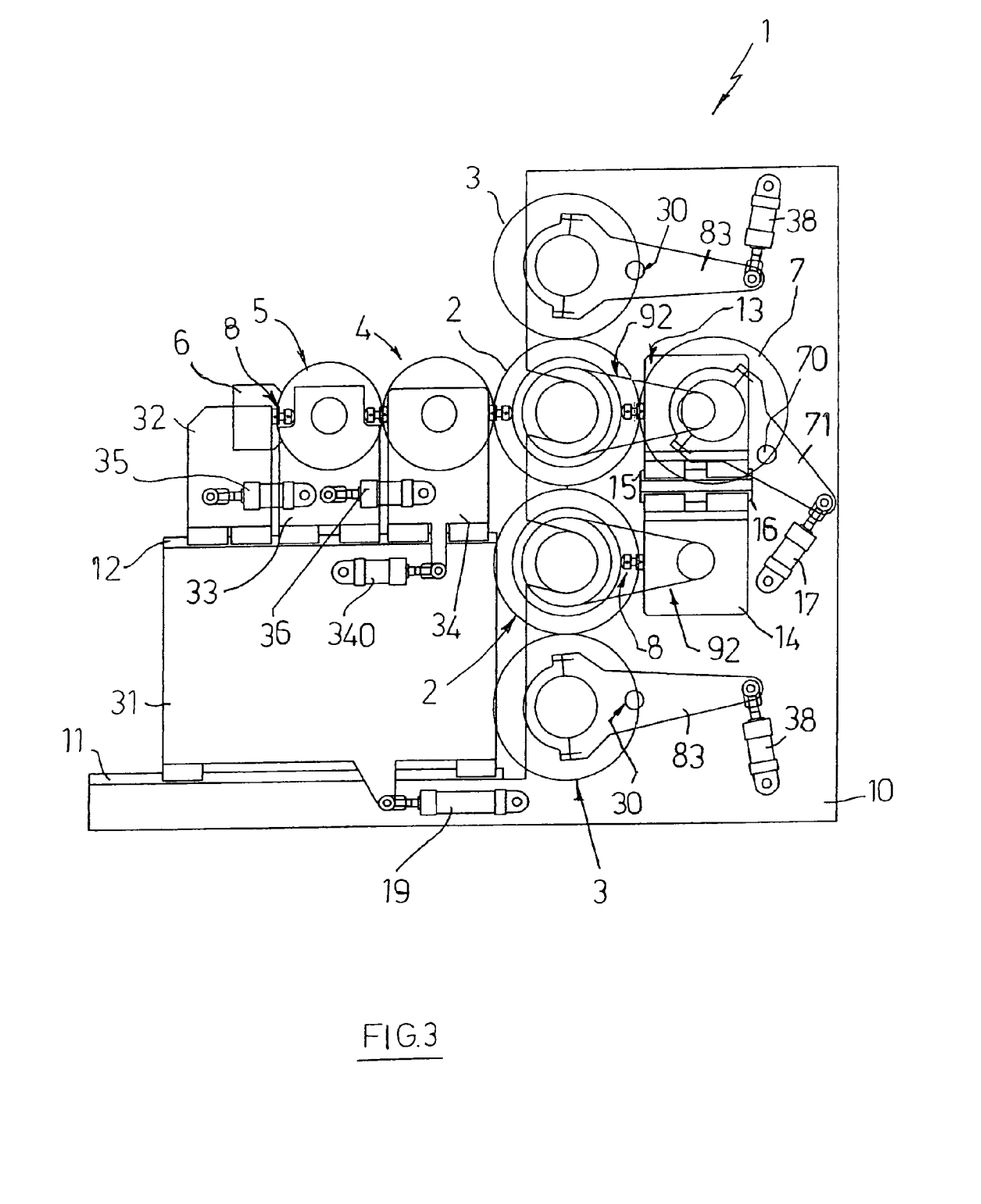
FIG. 3 is a schematic side view, in which some parts are in transparency or have been omitted, of an embossing unit provided with a device according to a possible embodiment the present invention.

With reference to the example shown in FIG. 3, first paper web or ply (which is being embossed by the lower couple of rolls) travels from right to left between the lower rubber roll 3 and the lower engraved roll 2; once embossed, this paper web wounds around the lower engraved roll in a clockwise direction, and passes between the lower and upper engraved rolls 2. Subsequently, the first paper web or ply passes, with the second paper web or ply, between the upper engraved roll 2 and the marriage roll 7. The second paper web (which is embossed by the upper couple of rolls) travels from right to left between the upper rubber roll 3 and the upper engraved roll 2; said second paper web, once embossed, wounds around the upper engraved roll 2 (in a counter-clockwise direction) where it is glued by the cliché roll 4. Subsequently, the second paper web or ply passes between the two engraved rolls 2 and is coupled with the first paper web which comes from the lower rolls couple and follows a path from downward to upward passing between the upper engraved roll 2 and the marriage roll 7 which completes the coupling of the two paper webs.

The upper engraved roll 2 is operated by a corresponding motor 9 to which it is connected by means of a belt 92 as further described below. Said motor 9 is mounted on a support frame 13 which, in turn, is mounted on a horizontal guide 15 on which the support 13 is free to slide.

In this example, also the lower engraved roll is connected to a corresponding motor by means of a belt 92; the corresponding lower support frame is marked with reference 14. Also the frame 14 can slide along a horizontal guide 16.

The marriage roll 7 is supported by the head of a connecting rod 71 whose foot is connected with the stem of an actuator 17. The body of the latter is solid to the frame 10. The connecting rod 71 is hinged about an intermediate horizontal pin 70. The extension and respectively the retraction of the actuator stem causes the marriage roll 7 to approach the upper engraved roll 2 and respectively to move away from it, by provoking the rotation of the connecting rod 71 about the axis of the horizontal pin 70.

It is possible to move the two rubber rolls 3 in a similar way. In fact, each rubber roll 3 is supported by the head of a connecting rod 83 whose foot is connected to the stem of an actuator 38. The body of each actuator 38 is solid to the above mentioned frame 10. The connecting rod 83 is hinged about an intermediate horizontal pin 30. The retraction and respectively the extension of the stem of the actuator 38 cause the rubber roll 3 to approach the corresponding engraved roll 2 or to move away from it, by provoking the rotation of the connecting rod 83 about the horizontal pin 30. Moreover, spacers 8 are provided between the glue tank 6 and the anilox roll 5, between the anilox roll 5 and the cliché roll 4, between the cliché roll 4 and the upper engraved roll 2, between the upper engraved roll 2 and the support frame 13 of the motor 9 and between the lower engraved roll 2 and the support frame 14 of the corresponding motor. The gluing unit 4, 5, 6 is mounted on a main structure 31 which slides along a horizontal guide 11. The motion of the main structure 31 along the guide 11 can be obtained by means of an actuator 19. The latter is connected, by means of its stem, to the main structure 31, and, by means by its body, to the (fixed) frame 10 of the embossing unit. The glue tank 6, the anilox roll 5 and the cliché roll 4 are supported by corresponding secondary structures 32, 33 and 34. Each of said secondary support structures 32, 33 and 34 can slide along a horizontal guide 12 presented by the main structure 31 at its upper zone.

A horizontal actuator 35 is positioned and acts between the secondary structure 32 and the secondary structure 33. Another horizontal actuator 36 is disposed and acts between the secondary structure 33 and the secondary structure 34. Moreover, another horizontal actuator 340 is disposed and acts between the secondary structure 34 and the said main structure 31. As illustrated in FIG. 3, the actuator 340 is connected to one flank of the main structure on one side and, on the other side, it is connected to an extension of the secondary structure 34. In particular, the actuator 340 is destined to push the cliché roll 4 towards the upper engraved roll 2 so that the spacers 8 associated with the secondary structure 34, can touch the flange 24 (shown in FIG. 4) of the upper engraved roll 2 and keep a correct distance between the surface of the cliché roll 4 and that of the upper engraved roll 2. Similarly, the actuator 35 is destined to keep the spacers 8 associated with the secondary structure 32 in contact with the structure 33; and the actuator 36 keeps the spacers 8 associated with the secondary structure 33 in contact with the structure 34.

The whole gluing unit (i.e. the main structure 31) can be moved by means of the actuator 19 during maintenance of the machine or when replacing the rolls used for the embossing process or to cause the gluing unit 4,5,6 to move away from the rolls 2,3 (i.e. from the upper roll 2) or to approach them. Due to the pressure exerted by a rubber roll 3 on the respective engraved roll 2, the jacket of the latter can be subject to translation. With reference to the upper engraved roll 2 shown in FIG. 3, a downward and leftwards diagonal translation of the jacket 22 may occur (by effect of the pressure exerted by the roll 3 and by effect of the pressure exerted by the marriage roll 7). The horizontal component of this motion determines a traction of the belt 92 which consequently moves the respective motor 9 (on the left in the example) as said motor is positioned on the support 13 which, in turn, can slide along the horizontal guide 15. In other words, according to the present invention, a possible over-tensioning of the belt 92 is totally and automatically removed thanks to the motion of the frame 13 along the guide 15.

The same happens with the lower embossing unit where the frame 14 is also horizontally movable along the respective guide 16.

Similarly, the above mentioned horizontal component of the motion to which the jacket 22 of the upper engraved roll may be subject determines the horizontal translation (leftwards in the example) of the gluing unit 4,5,6 as the secondary structures 32,33,34 can slide along the guide 12 and a spacer 8 is provided between the structures 32 and 33, between the structures 33 and 34, and between the structure 34 and the flange 24 of the jacket 22.

The vertical component of the above diagonal motion does not cause any negative effects on the functioning of the system, as it is of no relevance in relation to the position, to the geometrical structure and to the size of the rolls commonly used in a embossing unit. Therefore it does not require any compensating action.

Figure 4:
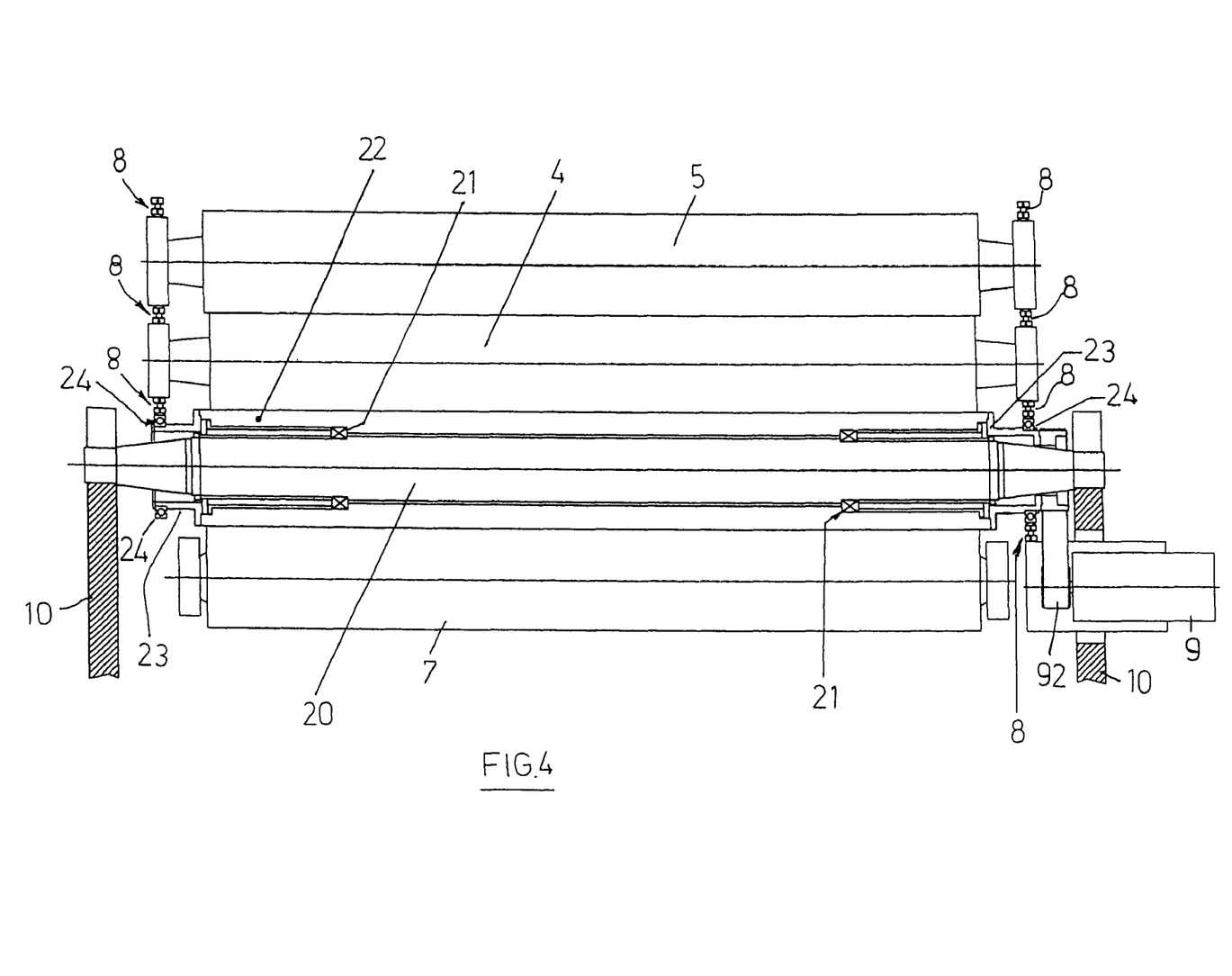
FIG. 4 is a schematic view according to a section which passes through the axes of rolls 5, 4 and 2 of FIG. 3.

FIG. 4 shows a detail concerning the connection between some parts of an embossing unit according to the present invention. In particular, the jacket 22 is provided with corresponding flanges 23 at its ends, on which two corresponding bearings 24 are fixed. The jacket 22 receives the motion from the above mentioned belt 92 which engages one of its flanges 23 (the flange on the right in FIG. 4). The spacers 8 disposed between the cliché roll 4 and the engraved roll 2 are in contact with the external surface of the bearings 24.

In this way, the operating conditions remain optimal in any working conditions; in other words, each engraved roll 2 receives the most suitable pressure from the respective rubber roll 3 and, at the same time, it is always kept at the most correct distance from the cliché roll 4 and is correctly operated by the respective motor.

Figure 5:
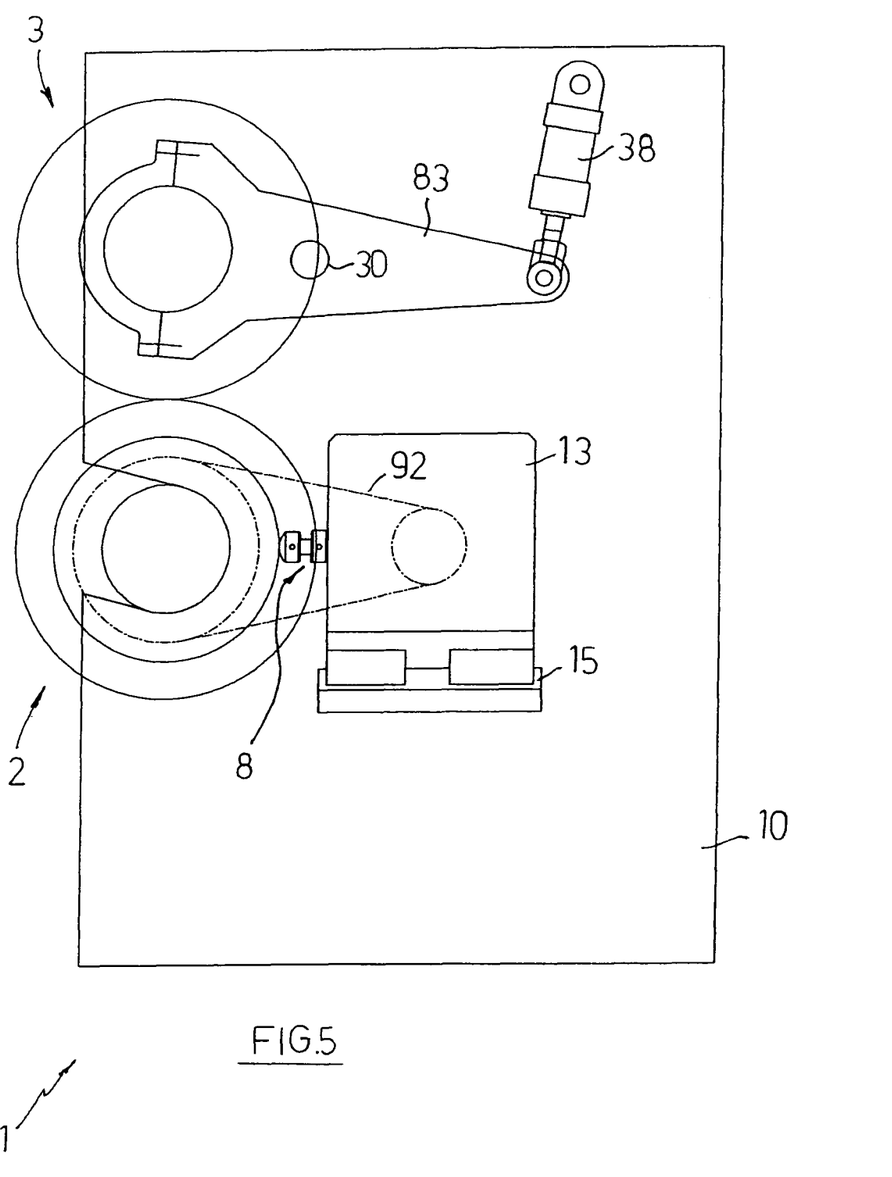
FIG. 5 is a schematic side view of a calender provided with a device according to the present invention.

FIG. 5 schematically shows a calender with two rolls between which a paper web or ply (not represented) is compressed. In this diagram, all the various elements which have been represented are marked with the same numerical references used in FIGS. 2-4, but the rolls 2,3 are both smooth steel rolls or steel rolls coated with hard rubber as they are destined to calendar the paper web or ply and not to emboss it. Both rolls 2,3 shown in FIG. 5 have the same structure as those previously described, that is to say they feature a fixed central shaft on which a tubular jacket is fitted by interposition of low friction connecting members (for example bearings) in which said tubular jacket is free to rotate about its longitudinal axis and is destined to come into contact with the paper which is being treated. In the diagram of FIG. 5 references 1 and 10 respectively indicate the whole calender and its frame. If the calender operates under a reduced pressure conditions between the rolls 2,3 (depending on the desired effect to be produced on the paper web or ply passing between these rolls), the support 13 of the motor that operates the roll 2 can also be fixed and the spacer 8 between the support 13 and the flange of the roll 2 can be omitted. The external jackets of the rolls 2,3 are both smooth.

Figure 7:
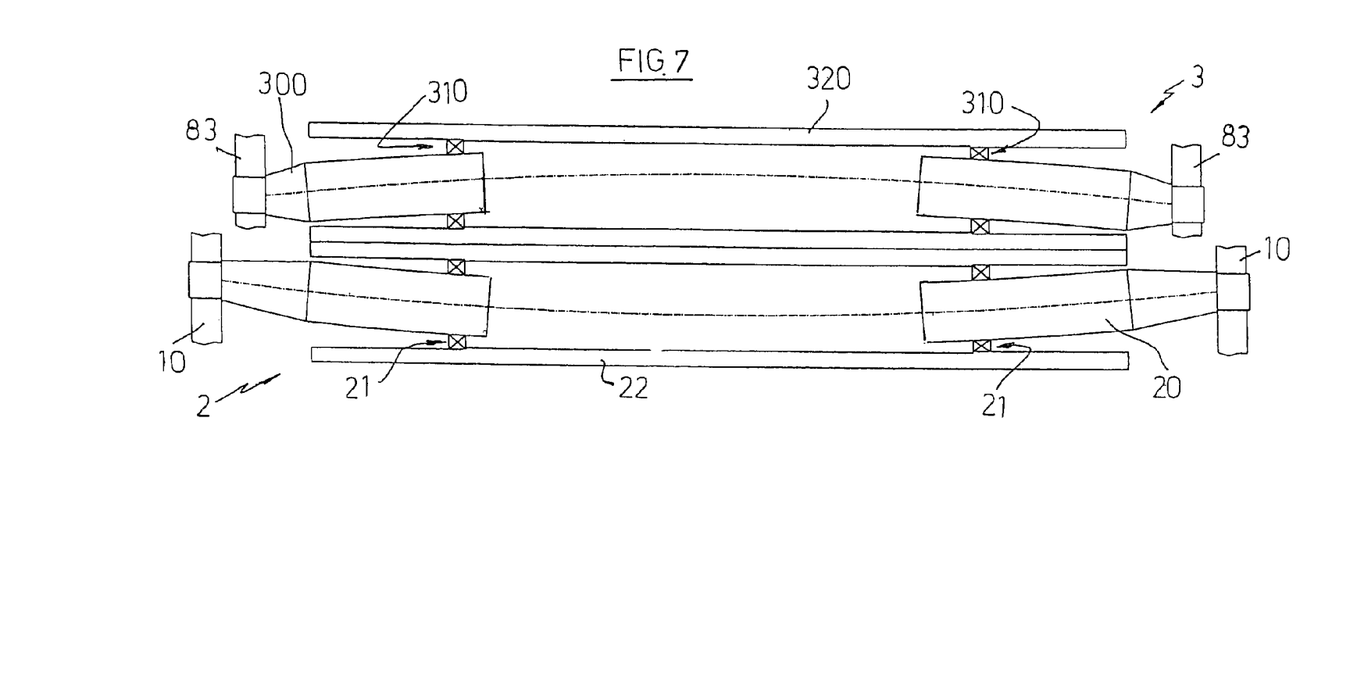
FIG. 7 schematically shows a device according to an alternative embodiment of the present invention during operation.

The example shown in FIG. 7 differs from that shown in FIG. 2 in that each of the shafts (20) and (300) is in two cantilevered parts instead of being in a single piece.

The handling, command and control members acting on the elements described above and shown in the enclosed drawings are known to industrial automation technicians and, therefore, therefore they are not described in detail.

It is understood that the drawings show only a possible embodiment of the invention, the forms and configurations of which may vary without however departing from the idea underlying the invention.

The invention claimed is:

1. A device for treating paper webs or plies, the device comprising:
   a couple of overlapped rolls for compressing a paper web or ply passing between said rolls, each of said rolls comprising a fixed central shaft supported by a corresponding holder at each end thereof, on which shaft a tubular jacket is fitted for contacting paper webs or piles to be treated, with the interposition of low-friction connecting members which are positioned on opposite sides with respect to a center line of a fixed central shaft axis, so that said tubular jacket is free to rotate about a longitudinal axis thereof, said rolls comprising a rubber roll and one of a steel roll and an engraved roll for embossing units, said one of said steel roll and said engraved roll being operated by a corresponding motor, said motor being mounted to a support, said support being mounted for movement such that said support slides along a horizontal guide.

2. A device according to claim 1, further comprising a second engraved roll and a second rubber roll for embossing another paper web or ply which is to be coupled to a previous paper web or ply, said second engraved roll and said second rubber roll being respectively identical to the first engraved roll and to the first rubber roll.

3. A device according to claim 2, wherein the another paper web or ply is glued to the previous paper web or ply by means of a gluing unit, said gluing unit comprising a cliche roll, said gluing unit being supported by a frame on which the gluing unit can translate horizontally when the jacket of the first engraved roll translates horizontally, wherein a distance between said jacket and said cliche roll remains constant.

4. A device according to claim 3, wherein said gluing unit comprises a tank, an anilox roll and a cliche roll disposed on corresponding structures capable of sliding on said frame.

5. A device according to claim 3, wherein said jacket is provided with flanges which are provided with bearings for contacting corresponding spacers presented by a cliche roll of said gluing unit.

6. A device according to claim 1, wherein said jacket of each of said rolls is smooth.

7. A device according to claim 1, wherein said low-friction connecting members comprise, for each fixed shaft, two bearings, wherein a distance between said bearings is less than a length of the respective fixed shaft.

8. A device for treating paper webs or plies, the device comprising:
   a first rubber roll comprising a fixed first rubber roll central shaft, a first rubber roll jacket, a plurality of first rubber roll holders and a plurality of first rubber roll low-friction connecting members arranged between said fixed first rubber roll central shaft and said first rubber roll jacket, said first rubber roll central shaft comprising a fixed first rubber roll central shaft axis, said first rubber roll jacket being rotatable about said fixed first rubber roll central shaft axis, one of said first rubber roll holders supporting one end of said first rubber roll central shaft and another one of said first rubber holders supporting another end of said first rubber roll, said first rubber roll jacket being connected to said fixed first rubber roll central shaft, said first rubber roll low-friction connecting members being arranged on opposite sides of said first rubber roll central shaft with respect to a center line of said fixed first rubber roll central shaft axis;
   a first engraved roll comprising a fixed first engraved roll central shaft, a first engraved roll jacket, a plurality of first engraved roll holders and a plurality of first engraved roll low-friction connecting members arranged between said fixed first engraved roll central shaft and said first engraved roll jacket, said first engraved roll central shaft comprising a fixed first engraved roll central shaft axis, said first engraved roll jacket being rotatable about said fixed first engraved roll central shaft axis, one of said first engraved roll holders supporting one end of said fixed first engraved roll central shaft and another one of said first engraved roll holders supporting another end of said fixed first engraved roll central shaft, said first engraved roll jacket being connected to said fixed first engraved roll central shaft, said first engraved roll low-friction connecting members being arranged on opposite sides of said first engraved roll central shaft with respect to a center line of said fixed first engraved roll central shaft axis;
   a motor connected to said first engraved roll;
   a support element, said motor being mounted on said support element;
   a horizontal guide element, said support element being movably mounted to said horizontal guide element such that said support element with said motor mounted thereto moves in a horizontal direction in response to movement of said first engraved roll jacket;
   a paper web or ply passing between said first rubber roll and said first engraved roll.

9. A device according to claim 8, further comprising:
   a second rubber roll comprising a fixed second rubber roll central shaft, a second rubber roll jacket, a plurality of second rubber roll holders and a plurality of second rubber roll low-friction connecting members arranged between said fixed second rubber roll central shaft and said second rubber roll jacket, said second rubber roll central shaft comprising a fixed second rubber roll central shaft axis, said second rubber roll jacket being rotatable about said fixed second rubber roll central shaft axis, one of said second rubber roll holders supporting one end of said second rubber roll central shaft and another one of said second rubber roll holders supporting another end of said second rubber roll central shaft, said second rubber roll jacket being connected to said fixed second rubber roll central shaft, said second rubber roll low-friction connecting members being arranged on opposite sides of said second rubber roll central shaft with respect to a center line of said fixed second rubber roll central shaft axis;
   a second engraved roll comprising a fixed second engraved roll central shaft, a second engraved roll jacket, a plurality of second engraved roll holders and a plurality of second engraved roll low-friction connecting members arranged between said fixed second engraved roll central shaft and said second engraved roll jacket, said second engraved roll central shaft comprising a second engraved roll central shaft axis, said second engraved roll jacket being rotatable about said fixed second engraved roll central shaft axis, one of said second engraved roll holders supporting one end of said second engraved roll central shaft and another one of said second engraved roll holders supporting another end of said second engraved roll central shaft, said second engraved roll jacket being connected to said fixed second engraved roll central shaft, said second engraved roll low-friction connecting members being arranged on opposite sides of said second engraved roll central shaft with respect to a center line of said fixed second engraved roll central shaft axis;
   a second motor connected to said second engraved roll;
   a second support element, said second motor being mounted on said second support element;
   a second horizontal guide element, said second support element being movably mounted to said second horizontal guide element such that said second support element with said second motor mounted thereto moves in a horizontal direction in response to movement of said second engraved roll;
   a second paper web or ply passing between said second rubber roll and said second engraved roll.

10. A device according to claim 9, further comprising:
    a gluing unit comprising a cliche roll, wherein the another paper web or ply is glued to the paper web or ply via said gluing unit, said gluing unit being supported by a frame on which the gluing unit can translate horizontally when the first engraved roll jacket translates horizontally, wherein a distance between said first engraved roll jacket and said cliche roll remains constant.

11. A device according to claim 10, wherein said gluing unit comprises a tank and an anilox roll, said tank, said anilox roll and said cliche roll being disposed on corresponding structures capable of sliding on said frame.

12. A device according to claim 10, wherein said first engraved roll jacket is provided with flanges which are provided with bearings for contacting corresponding spacers presented by a cliche roll of said gluing unit.

13. A device according to claim 8, wherein said first engraved roll jacket and said first rubber roll jacket are smooth.

14. A device according to claim 8, wherein said first engraved roll low-friction connecting members comprise two first engraved roll bearings and said first rubber roll low-friction connecting members comprise two first rubber roll bearings, wherein a distance between said two first engraved roll bearings is less than a length of said fixed first engraved roll central shaft and a distance between said two first rubber roll bearings is less than a length of said fixed first rubber roll central shaft.

15. A device according to claim 8, further comprising:
a belt connecting said motor to said first engraved roll, wherein a tension of said belt is adjusted based on movement of said support.

16. A device for treating paper webs or plies, the device comprising:
a first rubber roll comprising a fixed first rubber roll central shaft and a first rubber roll jacket, said first rubber roll jacket being connected to said fixed first rubber roll central shaft, said first rubber roll jacket being rotatable about said fixed first rubber roll central shaft;
a first engraved roll comprising a fixed first engraved roll central shaft and a first engraved roll jacket, said first engraved roll jacket being connected to said fixed first engraved roll central shaft, said first engraved roll jacket being rotatable about said fixed first engraved roll central shaft;
a belt;
a motor connected to said first engraved roll central shaft via said belt;
a support element, said motor being mounted on said support element;
a horizontal guide element, said support element being movably mounted to said horizontal guide element such that said support element with said motor mounted thereto moves in a horizontal direction in response to a deflection of said first engraved roll jacket, wherein tension in said belt is adjusted based on movement of said support;
a paper web or ply passing between said first rubber roll and said first engraved roll.

17. A device according to claim 16, wherein the tension in said belt is reduced from an over-tensioned state to a non-over-tensioned state via movement of said support.

18. A device according to claim 17, further comprising:
a plurality of first rubber roll holders;
a plurality of first rubber roll low-friction connecting members arranged between said fixed first rubber roll central shaft and said first rubber roll jacket, said first rubber roll central shaft comprising a fixed first rubber roll central shaft axis, said first rubber roll jacket being rotatable about said fixed first rubber roll central shaft axis, one of said first rubber roll holders supporting one end of said first rubber roll central shaft and another one of said first rubber roll holders supporting another end of said first rubber roll central shaft, said first rubber roll low-friction connecting members being arranged on opposite sides of said first rubber roll central shaft with respect to a center line of said fixed first rubber roll central shaft axis;
a plurality of first engraved roll holders;
a plurality of first engraved roll low-friction connecting members arranged between said fixed first engraved roll central shaft and said first engraved roll jacket, said first engraved roll central shaft comprising a fixed first engraved roll central shaft axis, one of said first engraved roll holders supporting one end of said fixed first engraved roll central shaft and another one of said first engraved roll holders supporting another end of said fixed first engraved roll central shaft, said first engraved roll low-friction connecting members being arranged on opposite sides of said first engraved roll central shaft with respect to a center line of said fixed first engraved roll central shaft axis.

19. A device according to claim 17, further comprising:
a second rubber roll comprising a fixed second rubber roll central shaft and a second rubber roll jacket, said second rubber roll jacket being connected to said fixed second rubber roll central shaft, said second rubber roll jacket being rotatable about said fixed second rubber roll central shaft;
a second engraved roll comprising a fixed second engraved roll central shaft and a second engraved roll jacket, said second engraved roll jacket being connected to said fixed second engraved roll central shaft, said second engraved roll jacket being rotatable about said fixed second engraved roll central shaft;
a second belt;
a second motor connected to said second engraved roll central shaft via said second belt;
a second support element, said second motor being mounted on said second support element;
a second horizontal guide element, said second support element being movably mounted to said second horizontal guide element such that said second support element with said second motor mounted thereto moves in a horizontal direction in response to a deflection of said second engraved roll jacket, wherein tension in said second belt is adjusted based on movement of said second support;
a second paper web or ply passing between said second rubber roll and said second engraved roll.

20. A device according to claim 19, further comprising:
a plurality of second rubber roll holders;
a plurality of second rubber roll low-friction connecting members arranged between said fixed second rubber roll central shaft and said second rubber roll jacket, said second rubber roll central shaft comprising a fixed second rubber roll central shaft axis, one of said second rubber roll holders supporting one end of said second rubber roll central shaft and another one of said second rubber roll holders supporting another end of said second rubber roll central shaft, said second rubber roll low-friction connecting members being arranged on opposite sides of said second rubber roll central shaft with respect to a center line of said fixed second rubber roll central shaft axis;

a plurality of second engraved roll holders;

a plurality of second engraved roll low-friction connecting members arranged between said fixed second engraved roll central shaft and said second engraved roll jacket, said second engraved roll central shaft comprising a fixed second engraved roll central shaft axis, one of said second engraved roll holders supporting one end of said fixed second engraved roll central shaft and another one of said second engraved roll holders supporting another end of said fixed second engraved roll central shaft, said second engraved roll low-friction connecting members being arranged on opposite sides of said second engraved roll central shaft with respect to a center line of said fixed second engraved roll central shaft axis.

* * * * *